United States Patent [19]
Pearson

[11] Patent Number: 5,245,759
[45] Date of Patent: Sep. 21, 1993

[54] METHOD AND EDGE FINDING APPARATUS FOR USE ON A MACHINE TOOL

[76] Inventor: Rune S. Pearson, 2919 Avenue "D", Katy, Tex. 77493

[21] Appl. No.: 863,178

[22] Filed: Apr. 3, 1992

[51] Int. Cl.$^5$ .................. B23Q 17/22; B23B 49/00; G01B 5/25
[52] U.S. Cl. ........................................ 33/638; 33/642; 33/644; 51/165.75
[58] Field of Search ................ 33/644, 638, 626, 628, 33/630, 632, 642, 645; 51/165 R, 165.74, 165.75

[56] References Cited

U.S. PATENT DOCUMENTS

| | | | |
|---|---|---|---|
| 2,533,198 | 12/1950 | Radtke | 33/644 |
| 2,878,575 | 3/1959 | Ganson | 33/626 |
| 3,129,918 | 4/1964 | Bradley | 33/626 |
| 3,432,932 | 3/1969 | Oellerich et al. | 33/642 |
| 3,531,867 | 10/1970 | Viollet | 33/642 |
| 4,043,046 | 8/1977 | Thomas . | |
| 4,208,157 | 6/1980 | Guarino et al. . | |
| 4,365,419 | 12/1982 | Ingels . | |
| 4,386,344 | 5/1983 | Vecchiatto . | |
| 4,406,069 | 9/1983 | Clement . | |
| 4,438,567 | 3/1984 | Raiha | 33/286 |
| 4,553,331 | 11/1985 | Salaam | 33/644 |
| 4,868,994 | 9/1989 | Pirce | 33/628 |
| 4,890,421 | 1/1990 | Moore, Jr. et al. | 51/165 R |
| 4,930,954 | 6/1990 | Daque . | |
| 5,036,595 | 8/1991 | Nevery | 33/642 |
| 5,136,815 | 8/1992 | Kramarenko et al. | 51/165 R |

OTHER PUBLICATIONS

Official Gazette, p. 878(no date) abstract of U.S. Pat. No. 2,878,575.
Official Gazette, p. 381, dated Jan. 13, 1954, abstract of U.S. Pat. No. 2,665,492.
Official Gazette, p. 1049, undated, abstract for U.S. Pat. No. 2,568,886.
Official Gazette, undated, abstract for U.S. Pat. No. 1,723,529.
Official Gazette, Nov. 1929, abstract for U.S. Pat. No. 1,398,881.

Primary Examiner—William A. Cuchlinski, Jr.
Assistant Examiner—C. W. Fulton
Attorney, Agent, or Firm—Edward J. DaRin

[57] ABSTRACT

A method and apparatus for finding an edge of a workpiece prior to machining the workpiece by a machine tool. The apparatus includes a collar that is mountable to be secured to the head of a machine tool. The collar has four flat surfaces spaced in quadrature on the outside surface thereof and an adjustable reference member extending outwardly therefrom for initial calibration. The apparatus also includes an edge finding assembly that is releasably clamped to the collar at the reference members for edge finding and carrying a dependent contact probe coupled to a dial indicator for indicating the movements of the contact probe, the collar and edge finding assembly being adapted to be fixed in a preselected vertical plane when mounted to the collar secured to the head of a machine tool for finding the true zero X & Y reference edges of a workpiece to be machined.

22 Claims, 9 Drawing Sheets

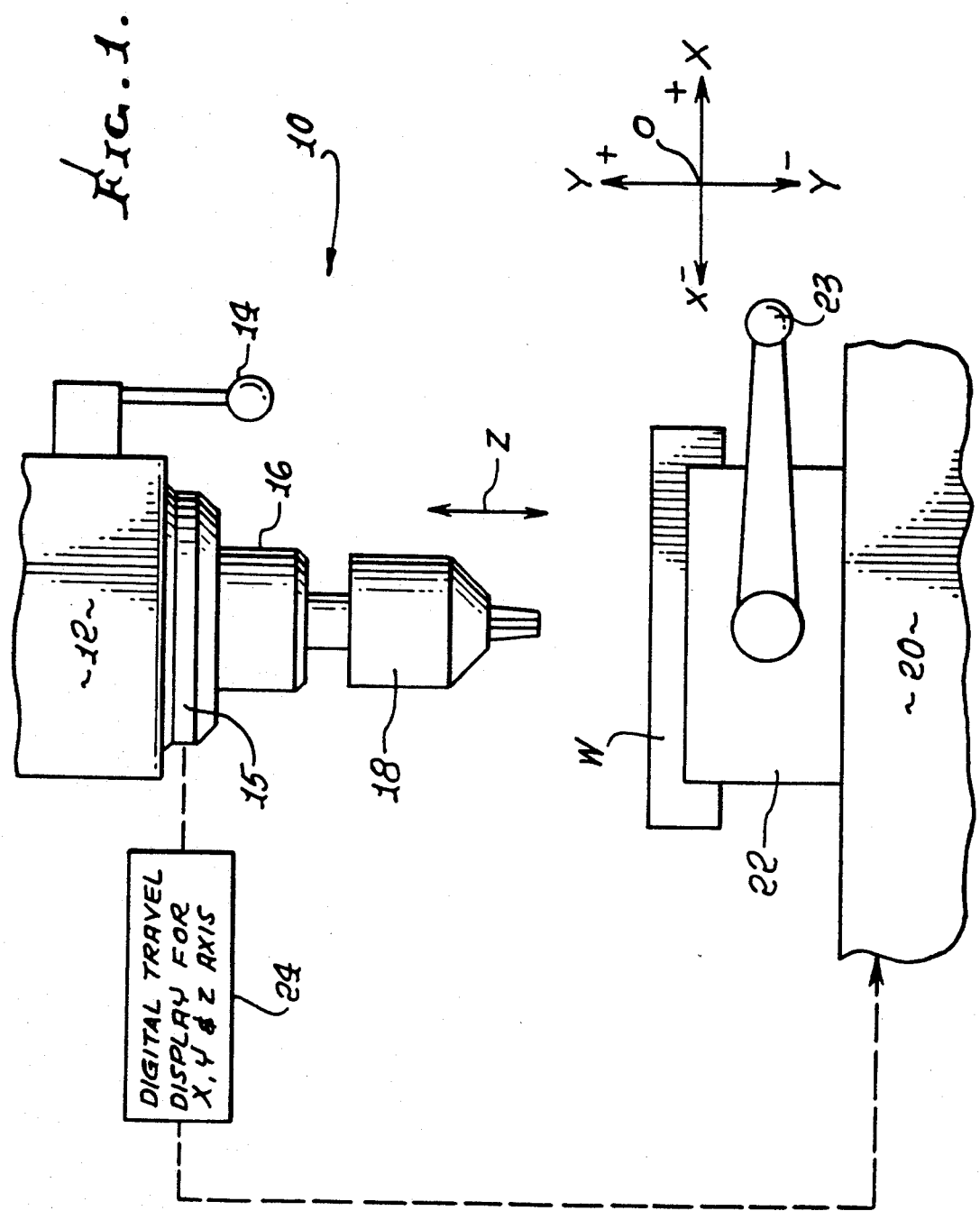

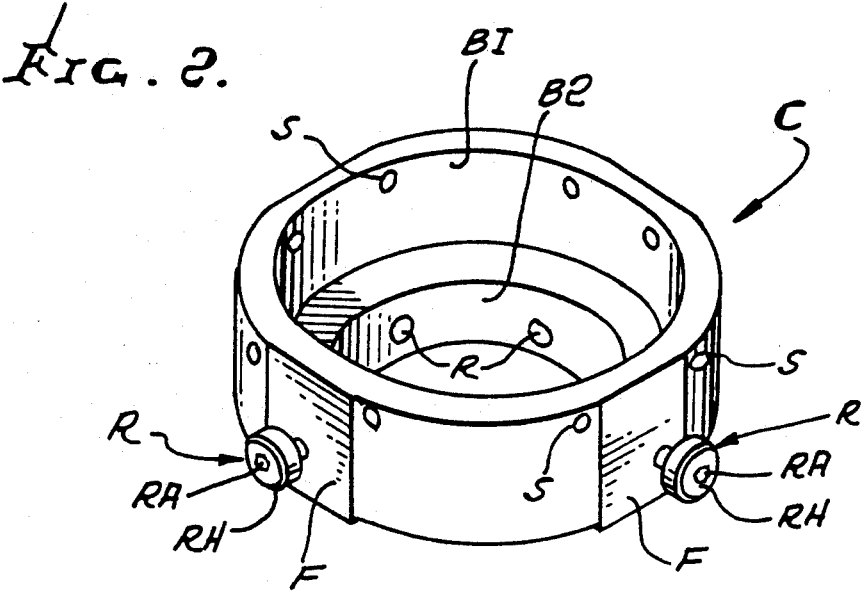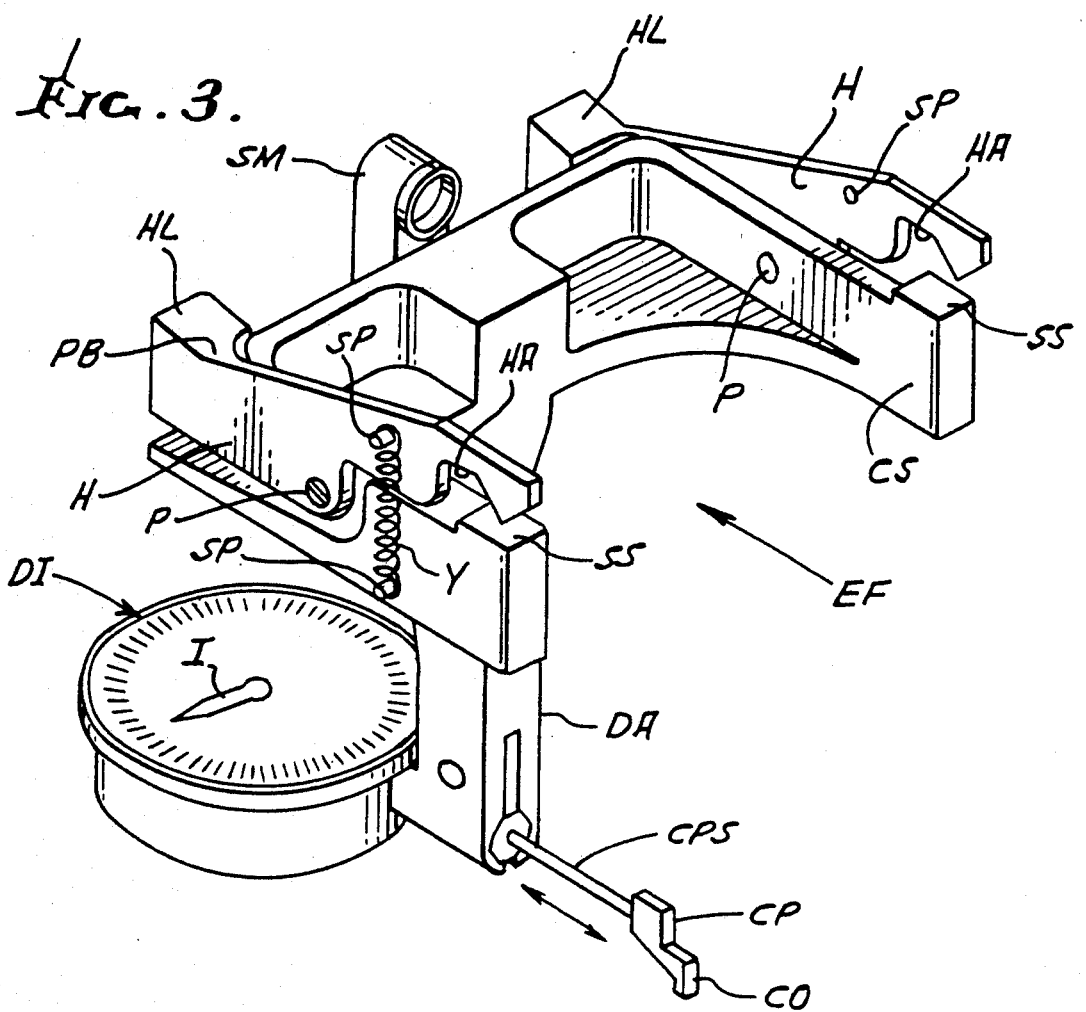

METHOD AND EDGE FINDING APPARATUS FOR USE ON A MACHINE TOOL

FIELD OF INVENTION

This invention relates to a method and apparatus for locating the true X & Y reference edges of a workpiece mounted on a machine tool with respect to the cutting tool of the machine tool to permit correct machining of the workpiece.

BACKGROUND OF INVENTION

A major problem encountered in the metal fabricating industry is the need to machine holes, slots, grooves and the like in a workpiece in accordance with a set of drawings of said part. These drawings always give dimensioned location of holes, grooves, etc. in relationship to the zero point of two edges, typically referred to as the zero X & Y points. Machine tools, such as milling machines generally include a chuck or collet for holding the cutting tool and a workpiece holder such as a vise which is rigidly affixed to a work table that can be moved in both the X & Y axis by means of manual dials or motorized drives either under manual or computer control.

For example, if a hole is to be drilled in a workpiece in the precise location indicated on an accompanying drawing, the operator must first locate the zero X and Y location of the workpiece. This X & Y zero point corresponds to the exact center of the drill bit held in a chuck or collet. Once the X & Y zero location has been located, the workpiece is then moved the exact distance indicated on accompanying print so that the hole can be drilled in the correct location.

Movement distance after obtaining the X & Y zero points are calculated by the use of graduated dial collars on the X & Y turn handles or through the use of the more common digital travel display. The digital dial collars or digital display are zeroed out when each respective edge is located. The table is then moved the desired distance in both the X & Y axis until the cutting tool is properly located on the workpiece to accomplish the desired machining operation.

Various types of electrical and non-electrical edge finders are currently being used to locate the above stated X & Y zero points. Both the electrical and non-electrical types must be mounted in the cutting tool location and therefore the cutting tool must first be removed, then the edge finder is mounted in the cutter position. Assuming we are using an electric type edge finder as illustrated in U.S. Pat. No. 4,386,344, we now bring the quill downward until the tip of the edge finder s just to the outside of the workpiece and slightly below the top surface on the X axis. Next the table holding the workpiece is moved towards the edge finder until we just make contact. The contact is indicated by the light turning on.

The dial collar or digital display is then reset to zero and the edge locating process is repeated to verify the accuracy of the first operation. We verify the accuracy by seeing that the dial collar or digital display is on zero point when the edge finder light turns on. If the displays are not on zero, we must again reset the dial collar or digital display to zero and repeat edge finding process until we have verification.

Since the current edge finding process relies on visual judgement only, the operator must move the table slowly to be sure there is no overtravel after contact is made. Once the edge location has been verified, the edge finder is moved above the workpiece and the table is moved another distance equivalent to ½ of the diameter of the edge finder probe. The dial collar or digital display is again reset to zero and now we have the true center point of the cutting tool aligned to the exact edge of workpiece.

These steps must now be repeated for the Y axis. After locating the X & Y zero position, the edge finder is removed and the cutting tool put back in. Now the machining process can begin.

As can be seen from the above description, properly locating the zero X & Y reference edge of a workpiece is quite time consuming and the operator must take care in judging the exact time of probe contact with the workpiece and be sure to not overtravel. While the electrical type is somewhat quicker to use in terms of locating a precise edge, they depend on an electrically conductive path between workpiece and edge finder and cannot therefore be used on any non-conductive material such as plastics.

The non-electrical type require that the machine spindle turns while the operator looks for a slight axial disalignment to occur at the tip of the edge finder. The non-electrical type is therefore somewhat slower to use and requires more care than the electrical type.

As can be seen, both of the above indicator types require a three step process to find the true zero point of any edge. After the edge finder first locates the edge of the workpiece, the digital display, or equivalent, is set to zero. The edge finding process is then repeated to verify accuracy and then the table is moved half the distance of the edge finder in order to locate the true zero reference point.

In both of the above edge finder methods, the workpiece must approach the edge finder in a slow and careful manner to prevent overtravel which, if excessive, will damage the edge finder tool.

Also, the edge can only be located when moving the table in one direction. That is while the workpiece is being moved towards the edge finder.

As can be easily understood from the above description, both of the methods currently in use have some major problems.

1. They are very time consuming to use as existing cutting tool must be removed so that edge finder can be mounted in that location and after locating the reference edges, the edge finder must again be replaced by the cutting tool before any work can be done.

2. The actual edge finding process requires careful and slow approach to the workpiece when coming into contact with edge finder.

3. The edge finding process should be repeated at least twice for each edge in order to assure accuracy.

4. After completing step three above, the workpiece must still be moved to compensate for the radius of the edge finder.

5. Each time the cutting tool is removed the Z reference point (depth of cut) is lost and therefore must be reindicated after edge finder is removed and the cutting tool is re-installed.

6. The accuracy of both methods is highly dependent on operator skill, judgement and hand to eye coordination.

SUMMARY OF INVENTION

The present invention provides an improved method and apparatus for quickly and easily locating a workpiece mounted on a machine tool in a precise and accurate alignment with the chuck of the machine tool in less time than required by the use of the aforementioned prior art edge finders. The time required to locating the edges of a workpiece is approximately ¼ of the time required for prior art edge finders now commercially available and in use. The task of finding the edges of a workpiece are further simplified by not requiring the removal of the cutting tool from the machine tool chuck and does not require the machine tool spindle to be in rotation and yet operative on workpieces that are conductive and non-conductive.

From a method standpoint the present invention comprehends the steps of mounting and securing a collar on a preselected portion of the head for a machine tool, the collar having a plurality of flat surfaces of a preselected area defined in a quadrature spaced relationship with one another so as to lie in parallel to the X & Y axis of the mill table of a machine tool, each flat surface including an adjustable reference member extending a preselected distance outwardly of each flat surface and also functioning as securing elements and then mounting an edge finder indicator assembly on the machine tool head by releasably securing the assembly on a pair of diametrically spaced reference members on the collar and thereby clamp the assembly on the collar in a fixed vertical position thereon, the edge finder assembly carrying a slidable contact probe and dial indicator to be responsive to the longitudinal sliding movements of the contact probe and indicating the increments of movement about a reference point, locating the center of the machine tool spindle in relationship to an edge of a workpiece mounted on the machine tool.

Calibrating the edge finder indicator assembly in the four positions in quadrature with the four possible reference edges of a workpiece by calibrating one edge at a time in the following manner. Place a workpiece in a vise and using any type of current edge finder, locate the true zero reference point and reset dial collar or digital display to zero. Next, move workpiece away from the edge finder and attach the uncalibrated edge finder of the present invention to the collar and move workpiece towards the contact probe until the dial collar or digital display is again on zero. Now rotate reference member as required for the needle indicator to come to the exact zero position of the travel dial of the edge finder. Repeat this process for the remaining three edges.

From a structural standpoint, the present invention comprehends two separate units for mounting on the head of a machine tool for edge finding purposes. On unit is a unique collar for mounting and securing to the head of a machine tool. The collar includes a plurality of flat surfaces arranged in quadrature on the outside surface of the collar with each surface having an adjustable reference member extending outwardly therefrom to align the collar and the edge finder assembly in a horizontal position when mounted thereto for each edge surface of a workpiece mounted on the machine tool. The second unit comprises the edge finder indicator assembly that includes dial indicating means for indicating the travel of the machine tool table in preselected increments. The edge finder indicator assembly is constructed and defined to be releasably clamped onto the collar by means of a pair of adjustable reference members in a fixed, yieldable position thereon. The collar and the edge finder indicator assembly are constructed with mating surfaces to define a fixed horizontal position for the edge finder assembly when the collar is secured to the head of a machine tool. The edge finder assembly including seating means for seating a reference member there at and permitting the reference member to be adjusted in a horizontal position that defines the zero horizontal position for the calibrated position. The adjustment of the reference member resulting from the engagement of the contact probe for the edge finder assembly and the pre-referenced edge of a workpiece and the incremental difference indicated dictate the amount and direction of adjustment required of the reference member.

The edge finder assembly is pivotally secured to the securing reference members and is adapted to be pivoted in the opposite direction to be released from the mounting collar. The mounting collar may be permanently mounted to the machine tool head so that the above described calibration procedure needs only be done once.

The edge finder indicator assembly is constructed and defined to slide easily and quickly onto the reference members of the mounted collar and held in place by spring means so as to render the mounting procedure independent of operator judgement.

Once the edge finding assembly has been calibrated, the machine tool operator can readily locate the reference edge of the workpiece when the machine table is moved in any direction.

BRIEF DESCRIPTION OF THE DRAWINGS

These and other features of the present invention may be more fully appreciated when considered in the light of the following specification and drawings, in which:

FIG. 1 is a diagrammatic representation of a prior art machine tool in the form of a milling machine provided with a conventional electronic digital display for signalling, digitally, the increments of travel of the the milling machine table and the drill chuck movements for the purposes of the present invention;

FIG. 2 is a perspective view of a detached, mounting collar embodying the present invention;

FIG. 3 is a perspective view of the detached, edge finder assembly with a dial indicator embodying the present invention;

DETAILED DESCRIPTION OF THE PREFERRED EMBODIMENT OF THE INVENTION

Figure 5:
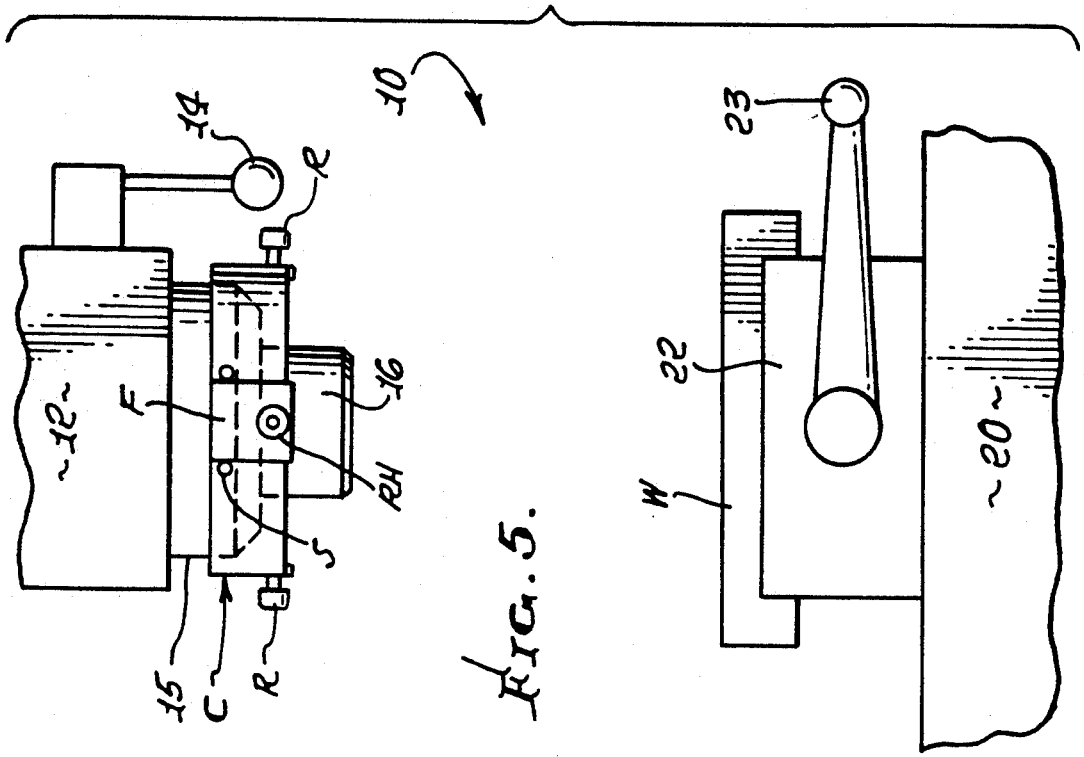
FIG. 5 is a diagrammatic representation of the milling machine of FIG. 1 with the mounting collar secured to the nose cone of the quill for the milling machine.

Now referring to the drawings, the presently preferred embodiment of the elements of the edge finding apparatus will be described with reference to a conventional machine tool of the milling machine type. To better understand the invention, the important parts of a milling machine 10 of the prior art will be described with reference to FIG. 1 of the drawings. The components of the milling machine 10 that are important for the understanding of the present invention are the milling head 12 mounting a rotatable quill feed handle 14. Mounted below the milling machine head 12 is the nose cone 15 for the quill spindle 16 dependent from the nose cone. The drill chuck 18 is secured to the quill spindle 16 to be movable therewith. As is conventional, the drill chuck 18 mounts a cutting tool (not shown). The rotation of the quill feed handle 14 is operative to move the nose cone 15, quill spindle 16 and drill buck 18 in unison, up or down in accordance with the direction of rotation of the handle 14. The rotation of the handle 14 in a counter-clockwise direction will cause the quill 16 and the associated parts to move downwardly. Rotating the handle 14 in a clockwise direction will cause the quill assembly to move upwardly. The movement of the quill assembly is denoted in FIG. 1 as the Z axis.

The other parts of the machine tool 10 is the milling machine table 20 that is longitudinally movable, along a "X" axis, with respect to the machine proper and the milling head 12 in particular. The milling table 20 is also movable in a transverse or cross direction, the "Y" axis, of movement. The mill table 20 is illustrated mounting a vise 22 having movable jaws operative by means of the vise handle 23 to secure a workpiece between the jaws thereof. A workpiece W of a rectangular configuration is illustrated secured by the vise 22 in FIG. 1.

The movements of the mill table 20 can be electronically signalled and visually displayed by coupling a conventional digital display 24 to the table for digitally indicating the increments of table movement in both "X & Y" directions relative to the "0" position. Similarly, the movements of the quill assembly by the operation of the handle 14 is detected by the movements in the Z axis of the quill 16 and the increments are displayed on the digital display 24 as the "Z" axis.

Now referring to FIG. 2, the first component or the collar C of the edge finding apparatus of the present invention will be described. The collar C, as illustrated, has a central, stepped bore with the larger diameter of the bore B1 being adapted to mount fully on the nose cone 14 of the milling machine 10. The small diameter bore B2 will extend below the nose cone 14 when the collar is mounted to the machine head, i.e. see FIG. 5. The collar C may be permanently secured to the nose cone 14 by the provision of a plurality of spaced set screws S arranged around the outer periphery of the collar C along the top periphery thereof as illustrated in FIG. 2. The outer face of the collar C is provided with a plurality of flat surfaces F arranged in a spaced, quadrature relationship with one another; four flat surfaces F are provided. Each of the flat surfaces F extend below the collar C proper to form a flat surface under the bottom of the collar. Each flat surface is provided with an adjustable reference member R extending a preselected distance outwardly of each flat surface F and arranged adjacent the bottom end of the flat surfaces F, as illustrated in FIG. 2. Each reference member R has an enlarged head RH with an adjustment aperture RA provided in each head RH for accepting a tool such as an Allen head wrench (not shown) for rotating the head R to change the length of the reference member extending outwardly of the flat surfaces F, as will be explained more fully hereinafter.

Referring to FIG. 3, the construction of the edge finder indicator assembly EF will now be examined. The edge finder assembly EF comprises of a plurality of components identified as the U-shaped clamping structure CS having a pair of longitudinally extending arms connected with an arm integrally formed with the longitudinal arms at one end to form the U-shaped structure. A pair of spaced holding members H are pivotably secured to the U-shaped structure on the outside surfaces of the arms of the U-shaped clamping structure CS. For this purpose the longitudinally extending arms of the structure CS are cut away in a complimentary fashion to the shape of the holding arms H from the pivot point P backward as seen from the left hand side of the structure CS in FIG. 3. The pivot point P is a fastener that pivotally secures each holding arm H to the structure CS. The portion of the clamping structure CS forward of the pivot point P is defined as a vertical wall extending to the front end of the structure. The top surface of this arm of the structure CS is stepped with the end portion of the arm extending upwardly a preselected distance and provided with a flat seating surface SS to be seated to the bottom flats for the flat surfaces F of the collar C, as will be evident hereinafter. The other longitudinal arm of the u-shaped structure CS is constructed the same. The holding arms H are similarly defined to pivot about the pivot points P. One end of the arm H has an L-shaped end HL to conform in a spaced relationship with the bridging arm of the U-shaped structure CS and movable with respect thereto. The holding arm H and the arm of the structure SS have securing pins SP arranged in vertical alignment for securing a separate end of yieldable means illustrated in the form of a spring Y that normally urges the arm H downwardly in a clock wise direction. The remaining end of the holding arm H is defined with an aperture HA of a configuration that permits the arm H to be readily snap locked to a fastener such as the reference members R of the collar C. The pivot point P has been selected to permit the holding arms H to be pivoted in a counter-clockwise direction when pressure is applied to an arm adjacent the back end, such as the point PB to cause the other end of the arm H to be rotated away from a securing member and become detached therefrom thereby freeing the holding arms H and permitting the clamping structure CS to be withdrawn from its clamping position.

The clamping structure CS is also provided with an upstanding seating member SM arranged substantially centrally of the arms of the structure C and extending vertically a distance to seat a reference member R for the collar C when the structure CS is clamped to the collar C as will be explained further hereinafter. The seating member SM is provided with a hollow bore of a diameter to seat a head RH of a reference member R and to permit an adjusting tool to be inserted therein for engaging the adjusting apertures RA of the heads RH.

Figure 8:
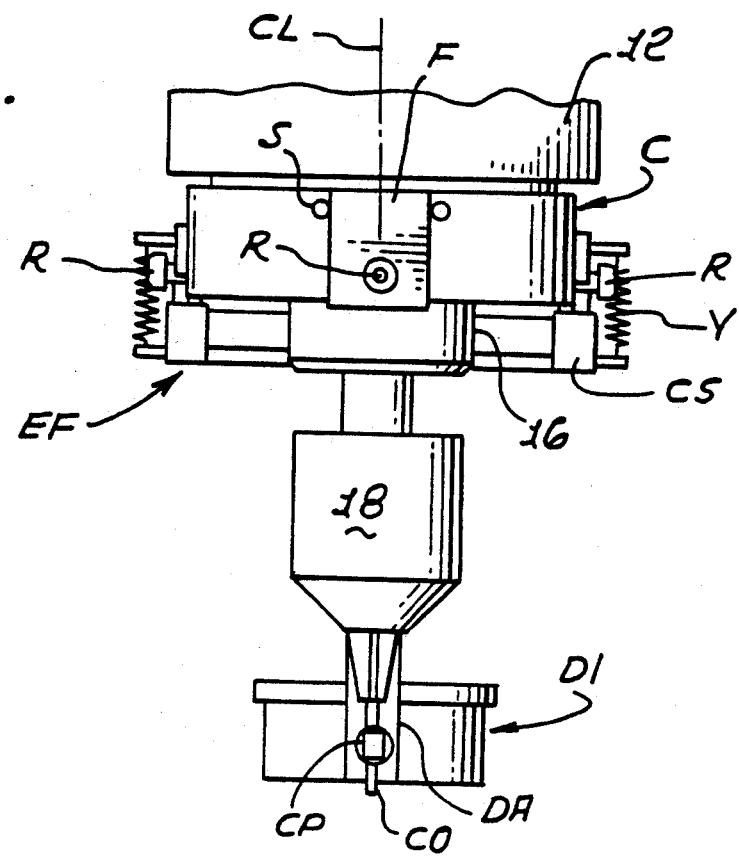
FIG. 8 is a partial, side elevational view of the view illustrated in FIG. 6.

The U-shaped clamping structure CS includes a dependent arm DA mounted substantially centrally of the arms of the structure and extending a preselected distance downwardly of the structure, as best illustrated in FIG. 8. The free end of the arm DA slidably mounts a contact probe comprised of a longitudinally movable shaft CPS having a contact probe CP secured to one end thereof. The contact probe CP has a rear body portion securing the contact probe shaft CPS and a stepped contact portion forwardly thereof that is provided with an arcuate contact surface CO in the form of a point contact. The opposite end of the shaft CPS is defined with a toothed section TS to transmit the longitudinal movements of the contact probe CP for actuating the commercially available dial indicator D1. The indicator D1 has a graduated rotary dial face with a movable indicator I for measuring the increments of movement of the contact probe CP for determining the true zero position of an edge of a workpiece W. The indicator I is rotatable in response to the movements of the contact probe CP.

Figure 7:
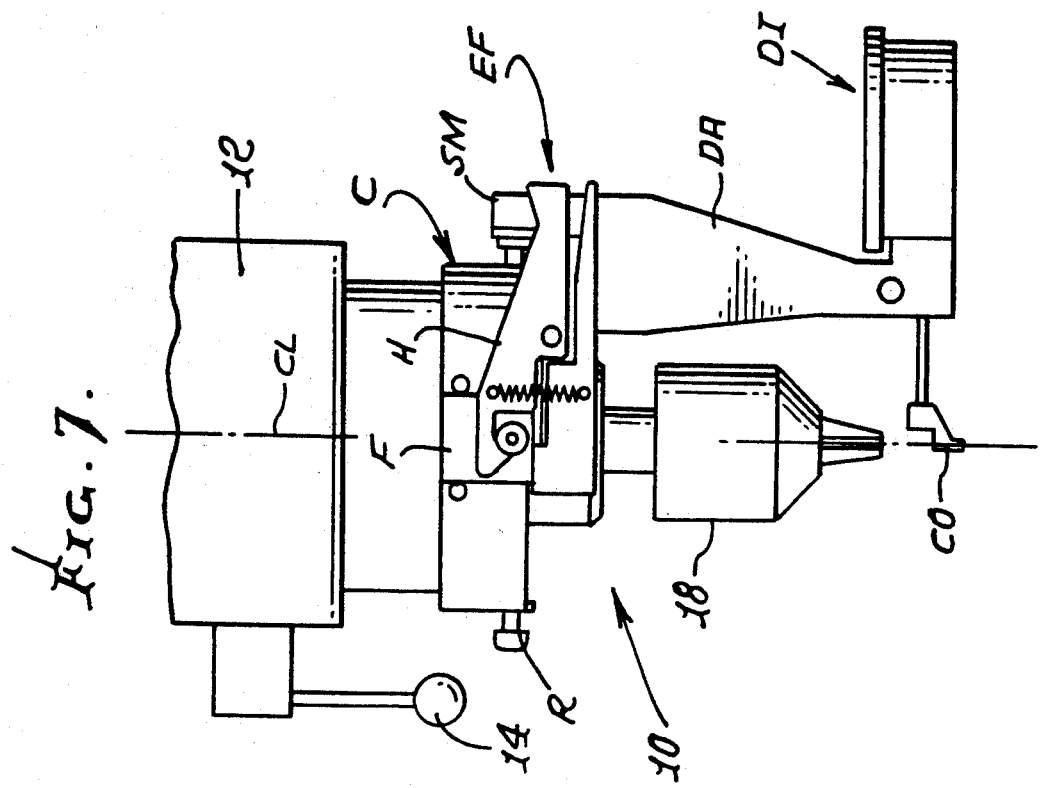
FIG. 7 is a partial, rear elevational view of the view illustrated in FIG. 6.
Figure 6:
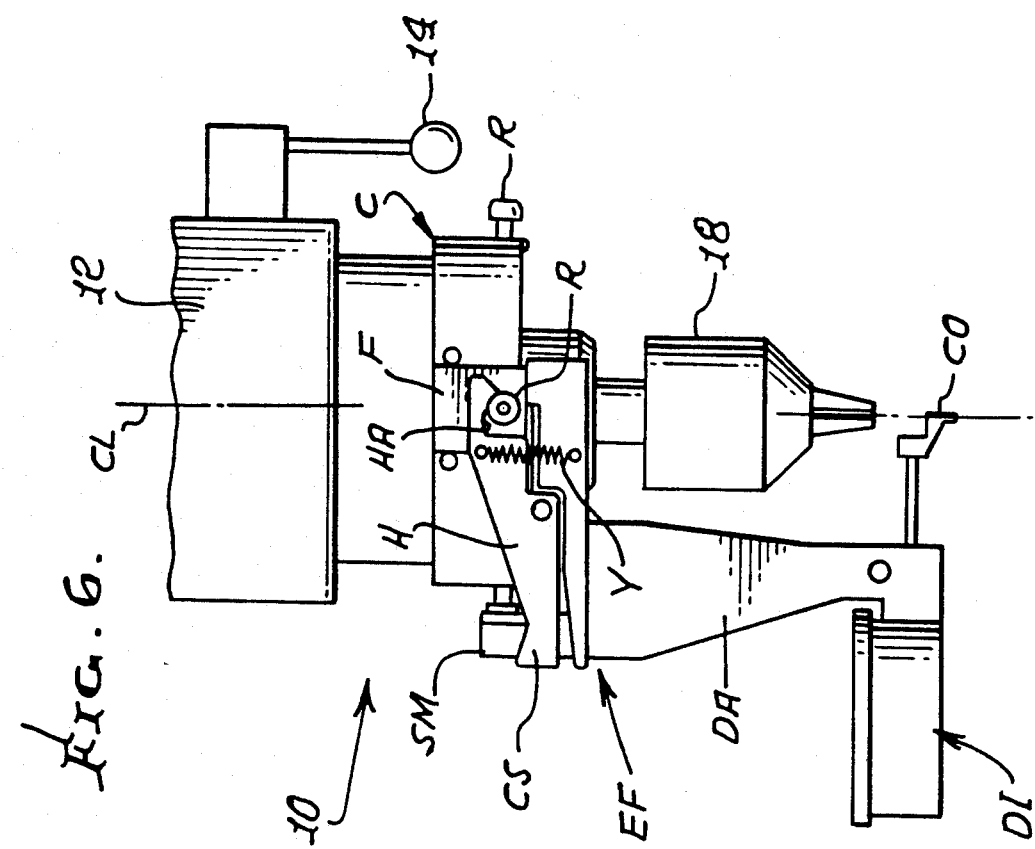
FIG. 6 is a partial, front elevational view of the milling machine with the collar and the edge finding assembly and dial indicator mounted to the collar and illustrating the edge finder contact probe in alignment with the drill chuck of the machine in preparation for locating a reference edge of a workpiece.

The U-shaped structure CS is defined with the open end sized to be mounted to the collar C when the collar is secured to the machine tool head as illustrated in FIGS. 6, 7 & 8, for example.

Figure 4:
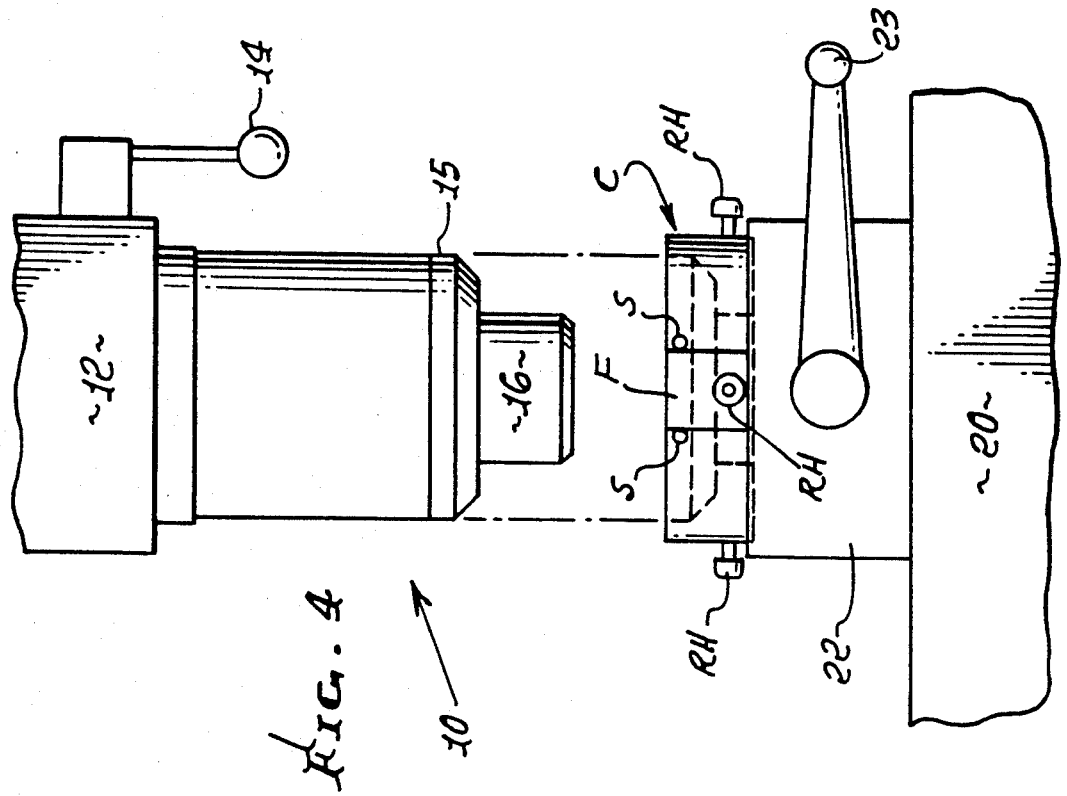
FIG. 4 is a diagrammatic representation of the milling machine of FIG. 1 illustrating the mounting collar of FIG. 2 secured to the machine vise in preparation for mounting the collar to the machine tool head.

With the structure of the collar C and edge finder assembly EF in mind, the steps of mounting these elements to the machine tool head will be explained. The first step in utilizing the edge finder of the present invention is to mount the collar C to the head of machine tool 10. With reference to FIG. 4, this first step will be examined. In order to accomplish this step, it is first necessary to remove the drill chuck 18 as illustrated in FIG. 4. The collar C is secured in the vise 22 so that a pair of diametrically spaced flat surfaces F are secured between the vise jaws. The vise 22 has its jaws in parallel alignment with the mill table 20. The mill table 20 is then moved to a position directly under the nose cone 15 so that it mounts with the mounting collar bore B1 upwardly, as is indicated by the pair of vertical dotted lines in FIG. 4. By operating the handle 14, the quill 16 and nose cone 15 are moved downwardly until the collar C is fully seated to the nose cone. The set screws S are then rotated to lock the collar C to the nose cone 14 thereby permitting it to ride upwardly with the reverse operation of the handle 14. This relationship is illustrated in FIG. 5. With the collar C as illustrated in FIG. 5, a flat surface F faces forward so that its surface is parallel to the X axis of the mill table 20. The reference members R for each flat surface F are also shown extending outwardly of their individual surfaces. It should be noted that once the collar C is properly mounted, it may be permanently left in place and subsequent edge finding operations may omit these steps.

Figure 11:
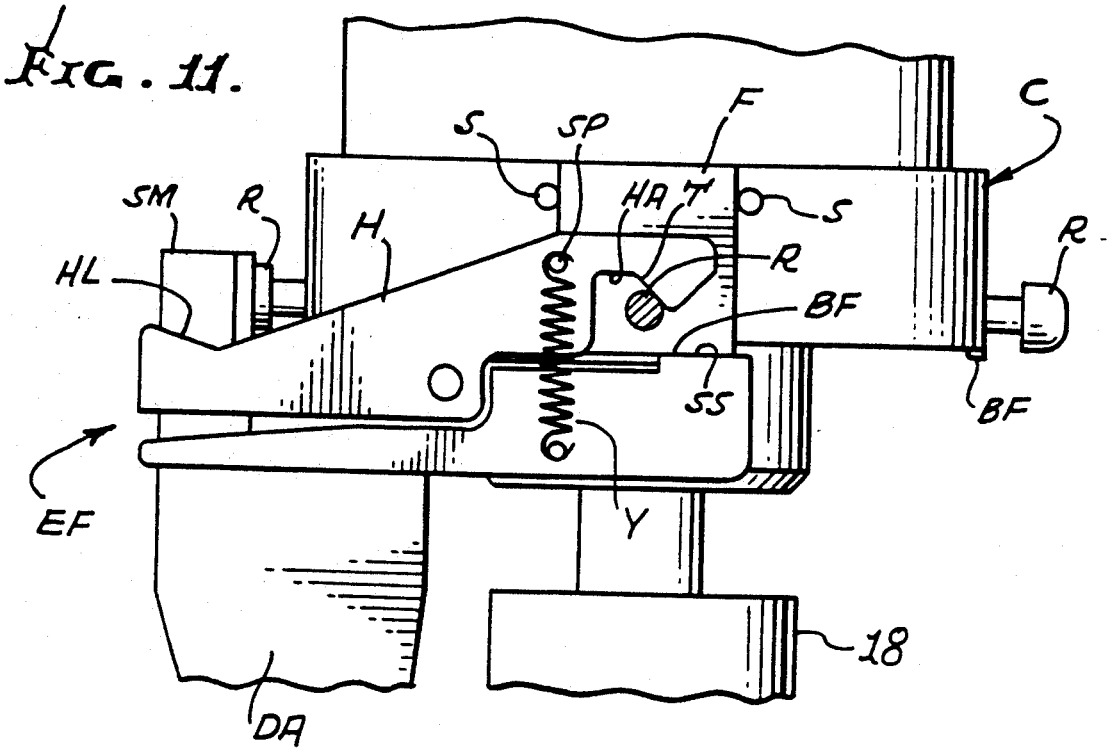
FIG. 11 is an enlarged, partial view of the assembled collar and edge finding assembly mounted on the machine tool head and illustrating the mating arrangement of the collar reference member and seating member for the edge finding assembly.

The next step is to attach the edge finder assembly EF (FIG. 3) to the mounting collar C from the left hand side thereof as illustrated in FIG. 6 with the open end of the U-shaped structure CS facing towards the collar. The U-shaped structure CS is easily moved to the right hand side to cause the securing aperture HA of the holding members H to be snapped over the shanks of the reference members R for the flat surface F facing forward as illustrated in FIG. 5 and the diametrically spaced member R spaced to the rear thereof. This snapped on position of the holding arms H and the reference member R is best appreciated from viewing FIG. 11. The reference member R of FIG. 11 has the head RH omitted therefrom merely to better illustrate how the tapered edge T of the securing apertures HA for the holding members H are secured at the shank for the reference members R. This snapped-on relationship results from the holding member H being moved to the right over the shank of the reference member R whereby the action of the spring Y forces the surface SS of the edge finder assembly EF upwardly against the flat surfaces extending under the flats F for the collar C. The bottom flat surfaces are identified as BF in FIG. 11. It should be clear that this same snapping on action simultaneously occurs on the opposite side of the collar C from that illustrated in FIG. 11. This mounting action not only releasably secures the edge finder assembly EF to the collar C but also defines the vertical extent of the edge finder assembly by the mating surfaces SS of the edge finder assembly and the surfaces BF for the collar C. The horizontal plane of the edge finder assembly EF is determined by the seating of the left hand reference member R for the collar C with the upstanding seating member SM as seen in FIG. 11. This mounting action also arrests the right hand movement of the assembly EF during the clamping action to the collar C.

Figure 12:
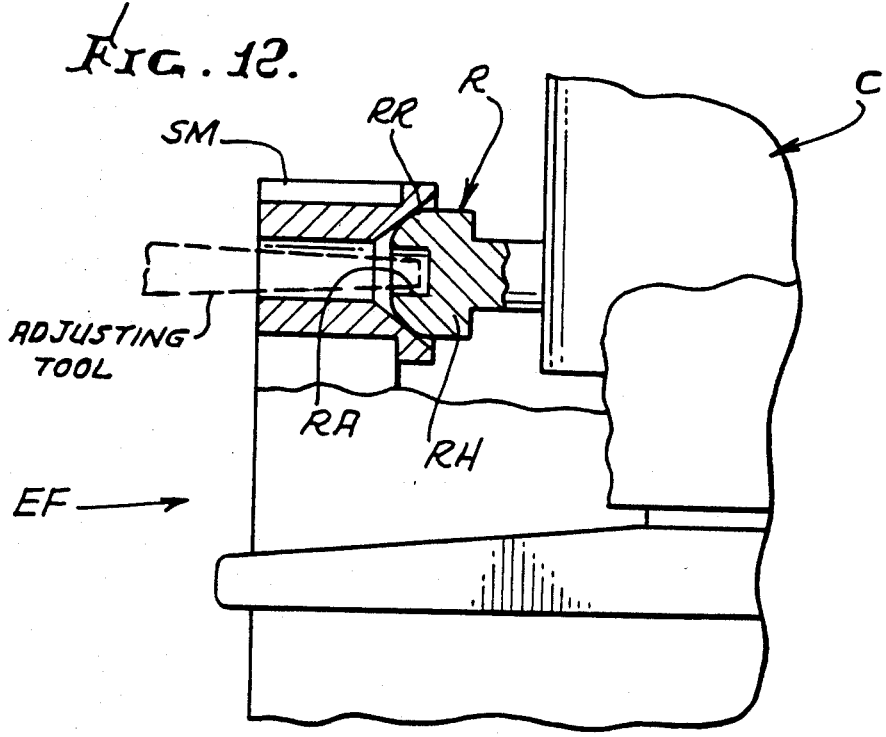
FIG. 12 is an enlarged, partial cross-sectional view of the mating structures for a reference member of the collar and the seating member for the edge finder assembly with an adjusting tool illustrated in dotted outline.

The specific structure of the upstanding seating member SM and the reference member R is detailed in FIG. 12. The reference member R is preferably constructed of stainless steel and adapted to be rotatably threaded into and out of the mounting flat surface F of the collar C. The head RH for the reference members R have an adjusting aperture RA of a preselected configuration (an Allen head tool configuration is illustrated in FIG. 2) to permit coaction with an adjusting tool (illustrated in dotted outline in FIG. 12) secured thereto to rotate the member R in a desired direction. The mating end of the seating member SM has an inwardly tapered portion as illustrated in FIG. 12. It is preferred that the tapered portion be ground mirror smooth to minimize the surface contact between the members SM and the reference member R. For this purpose, the member R has its head RH with radiused ends, identified in FIG. 12 as the ends RR.

Figure 9:
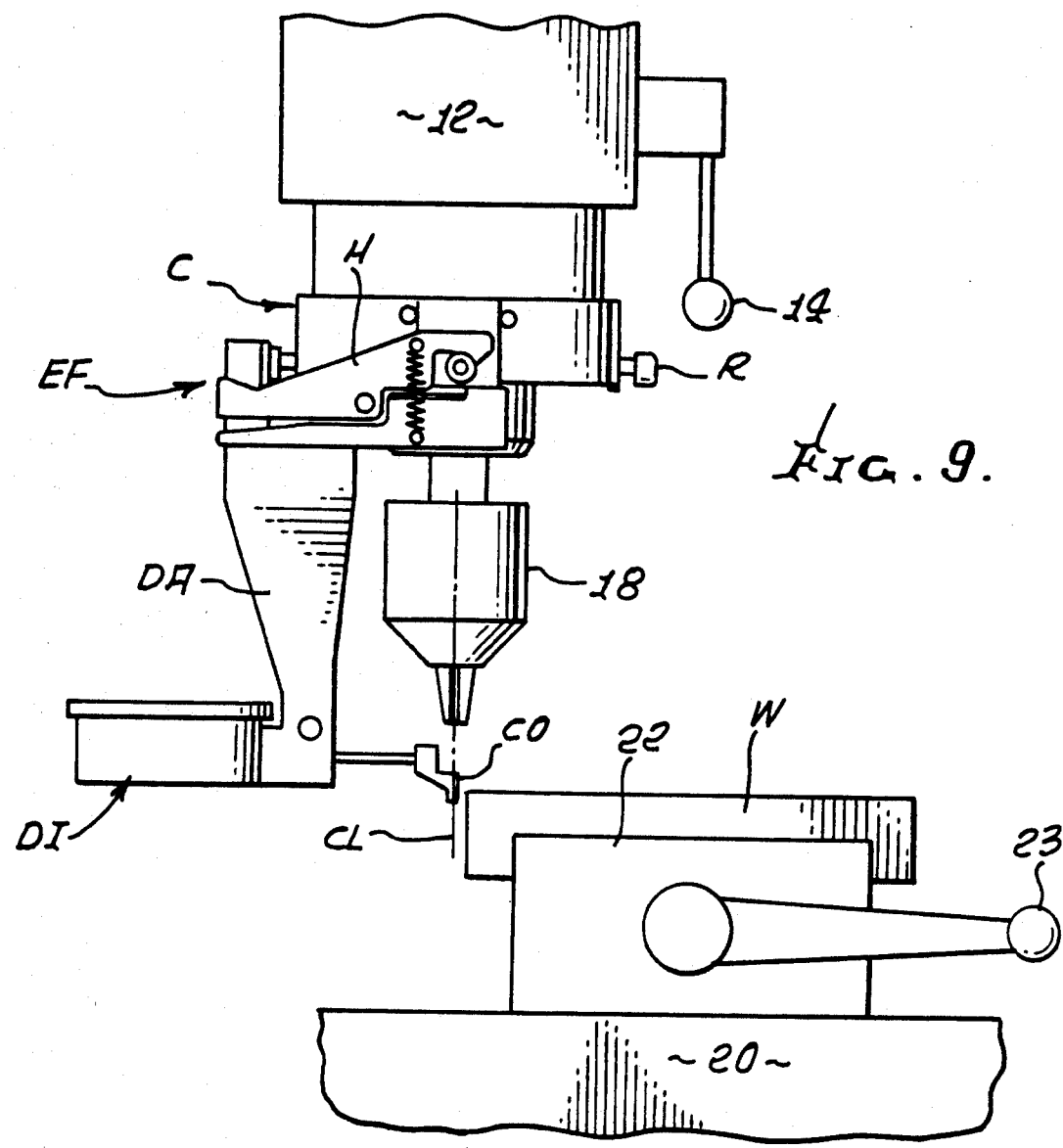
FIG. 9 is a front elevational view of the milling machine, as in FIG. 6, and a workpiece mounted on the machine table and illustrating the contact probe for the edge finder assembly spaced from an edge of the workpiece and the true zero tool/spindle center line indicated by the dotted line.
Figure 9A:
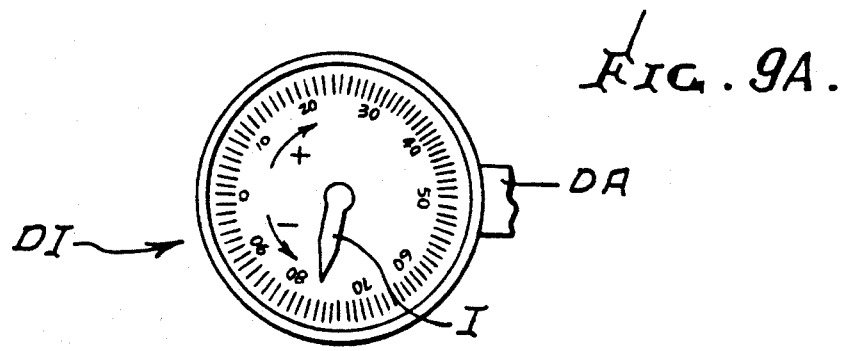
FIG. 9A is the top view of the dial indicator of FIG. 9 illustrating the dial indication for the positions of the contact probe and workpiece illustrated in FIG. 9.

The minimal surface contact between the reference member R and the mating end of the seating member SM, as described hereinabove, is an important structural feature of the invention since it assures the precise alignment between the collar C and the edge finder assembly EF and also prevents foreign matter including metallic chips that are generated during the machining operations from interfering with this precise alignment. For the same purpose, the contact between the flat surfaces SS & BF determining the vertical positioning between the collar C and the edge finder assembly EF in the vertical positioning of these elements and to firmly maintain these mating flat surfaces together and free of foreign materials. This is accomplished as a result of the wiping action that results during the mounting of the edge finder assembly EF to the collar C so as to push any foreign matter residing thereon away and off of the surfaces SS or BM. These features also maintain the edge finder assembly EF firmly in the correct relationship, all during the edge finding procedure. It should also be recognized able holding force of spring Y maintains a consistent holding force to correctly position the edge finder assembly EF during the edge finding procedure. This is also important for the consistent mounting of the edge finder assembly EF on the collar C and is not dependent on any skill required by the machine operator. The structural organization not only permits precise, repeatability of the mounting of the assembly EF at different positions on the collar C but also at different times whereby consistently accurate results are obtained with the use of this invention. The edge finder assembly EF may also be simply detached from the collar C by the machine operator exerting thumb pressure at points PB on the holding elements H. This will cause the elements H to rotate counter-clockwise from the secured positions, illustrated in FIGS. 6 & 9, so as to cause the elements H to be dis-engaged with the reference members R by rotating upwardly and over the member R by moving to the left as seen in FIG. 6. This permits the entire assembly EF to be grasped and moved to the left (per FIG. 6) and be released from its clamped relationship with the collar C. The edge finder assembly EF is detached from the collar C after it has been calibrated following the procedures to be discussed hereinbelow. The collar C, however, is not detached and remains as a permanent fixture on the machine tool head.

The construction of the collar C described hereinabove is to allow the collar to be mounted on the head of an existing machine tool. The same function can be provided by initially building in the flat surfaces F and the reference members R into the nose cone for a machine tool head at the time of manufacturing the machine tool 10.

Once the edge finder assembly EF and the collar C are correctly mounted to the nose cone 15 of the machine tool 10, the assembly EF must be calibrated in each of the four possible quadrant positions before it can be used to determine the correct X & Y zero reference edge of the workpiece.

Calibrating the edge finder indicator assembly in the four positions in quadrature with the four possible reference edges of a workpiece by calibrating one edge at a time in the following manner. Place a workpiece in the vise and using any type of current edge finder, locate the true zero reference point and reset dial collar or digital display to zero. Next, move workpiece away from the edge finder and attach the uncalibrated edge finder of the present invention to the collar and move workpiece towards the contact probe until the dial collar or digital display is again on zero. Now rotate reference member as required for the needle indicator to come to the exact zero position of the travel dial of the edge finder. Repeat this process for the remaining three edges.

Figure 10:
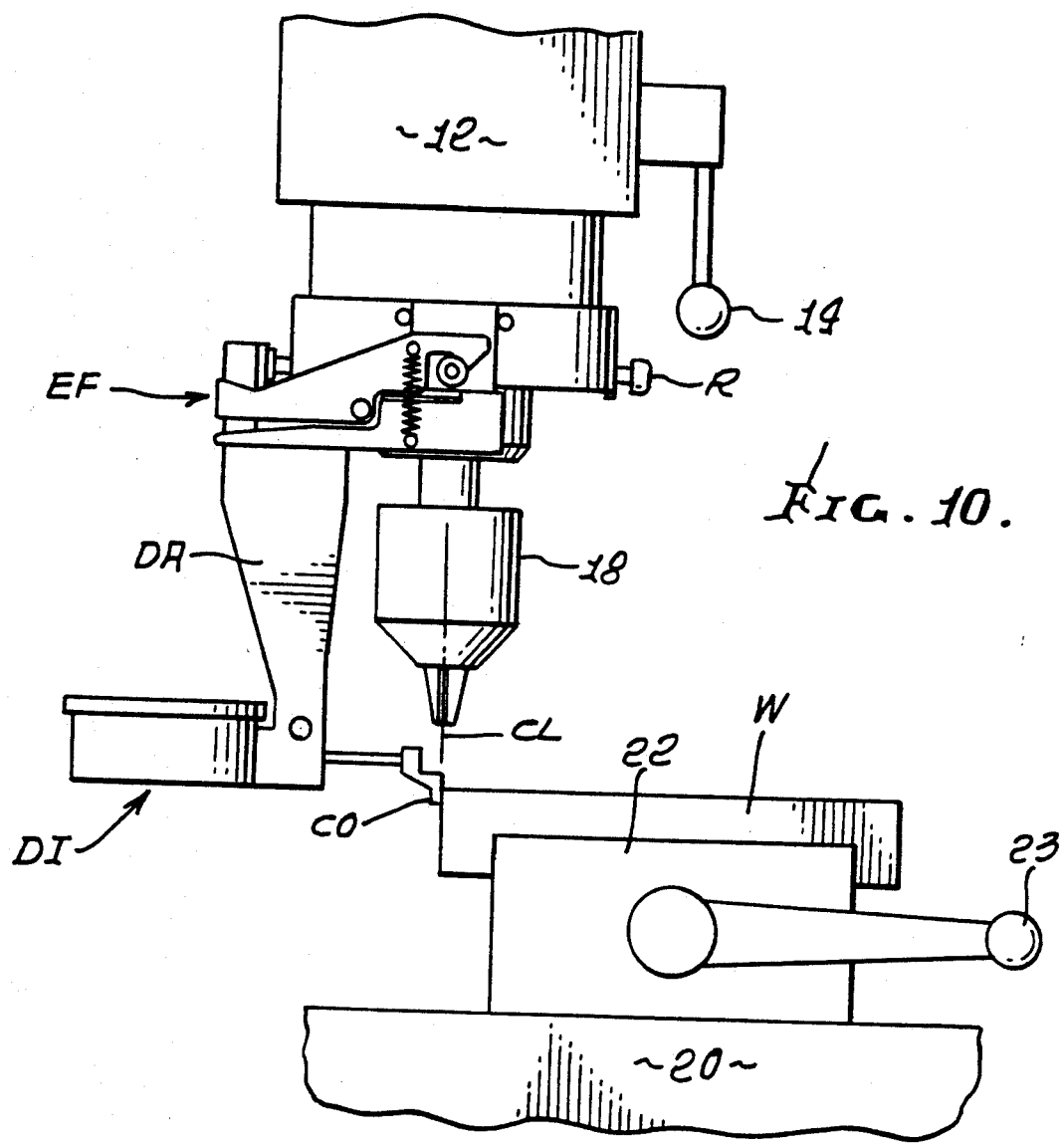
FIG. 10 is a front elevational view of the milling machine as illustrated in FIG. 9 but with the contact probe in engagement with the edge of the workpiece at the true, zero reference position.
Figure 10A:
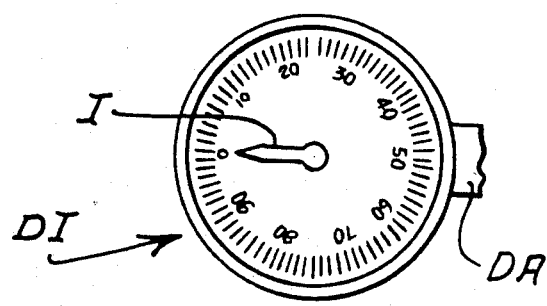
FIG. 10A is the top view of the dial indicator of FIG. 10 illustrating the indicator of the true, reference position of FIG. 10.

When the mill table 22 is moved to the point where the dial collar or the digital display is on zero, the dial indication for the indicator D1 must be read. If the "0" position is not indicated by the needle indicator I, the reference member R must be rotated in the correction direction to cause the needle indicator I to move from its indicated position, a position plus or minus beyond "0" to indicate the "0" point. This is accomplished by inserting an adjusting tool such as an Allen Wrench through the internal bore of the seating member SM into engagement with the aperture RA for the reference member to rotate it to achieve the correct "0" indication, see FIG. 12. The correct "0" position for the "X" axis of the workpiece W is illustrated in FIG. 10 and in FIG. 10A. The "0" position of the dial indicator D1 is indicated by the needle indicator I. This, then, indicates that the center line of the spindle/cutting tool of the machine tool 10 is at the true edge of the "X" axis of the workpiece.

Once the left hand edge of the workpiece W has been calibrated, the edge finder assembly EF is removed from the position illustrated in FIG. 10, and re-positioned in another pair of reference members to calibrate the assembly EF for the new position. For example, the assembly EF can be mounted to the collar C in a position 90 degrees spaced from the position illustrated in FIG. 10 for calibrating the "Y" axis corresponding to the front, longitudinal edge of the workpiece W as illustrated in FIG. 10. The same procedure as described hereinabove is followed for the new position of the assembly EF so that the "Y" axis is located at the true "0" position. The same procedure is followed until the edge finder assembly EF is calibrated for each "X" and each "Y" edge of the workpiece W. After completing the complete calibration procedure, the center line CL for the spindle/ tool can be located from any edge of the workpiece W to effect a cutting operation of the desired type in the workpiece by setting the digital display to "0" and making the desired measurements indicated on the working drawing. The working drawing for the workpiece will indicate the dimensions from an edge or between cuts on the workpiece to dictate which edge is the reference point for measuring the point to commence the cutting operation. The machining operations may commence once all of the edge referencing steps are completed and the edge finder assembly EF is detached from the machine tool nose cone 15.

Figure 13:
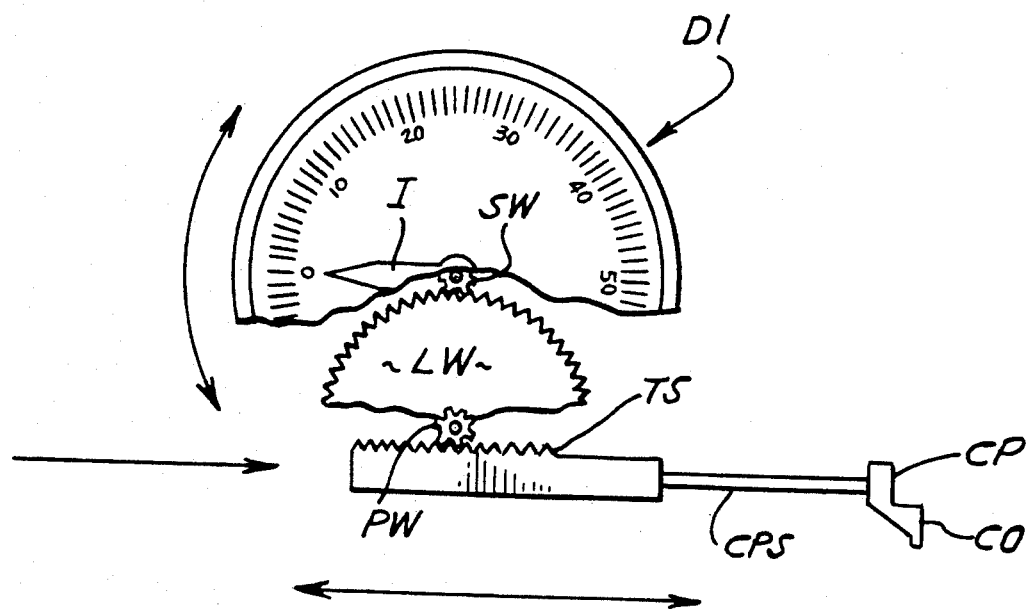
FIG. 13 is a diagrammatic representation of the coupling of the edge finder contact probe and dial indicator for indicating the dial increments of movement of the contact probe.

For the purposes of a complete and full disclosure of the present invention, the coupling between the dial indicator D1 and the contact probe shaft CPS will be described in conjunction with FIG. 13 wherein the coupling is diagrammatically shown. As illustrated therein, the contact probe shaft CPS is provided with a toothed portion TS at its end opposite the end mounting the contact probe CP. The toothed portion TS is externally toothed with a linear array of gear teeth to mesh with a circular tooth member or pin wheel PW to cause it to rotate in a direction in accordance with the positive or negative linear movements imparted to the shaft CPS. As illustrated in FIG. 13 the pin wheel element PW is mounted with a larger diameter toothed wheel LW coaxially therewith to cause the wheel LW to rotate in unison with the rotary motion of the wheel PW. The wheel LW in turn rotates another small toothed wheel SW spaced to mesh with the wheel LW and to rotate therewith. The needle indicator I is mounted to rotate with the wheel SW for indicating the increments of movement of the contact probe CP and the direction of movement. The left hand end of the contact probe shaft CPS has a spring force (not shown) applied thereto to urge it to the right, as illustrated. The construction of the dial indicator DI is of a commercially available product and forms no part of the invention.

Figure 14:
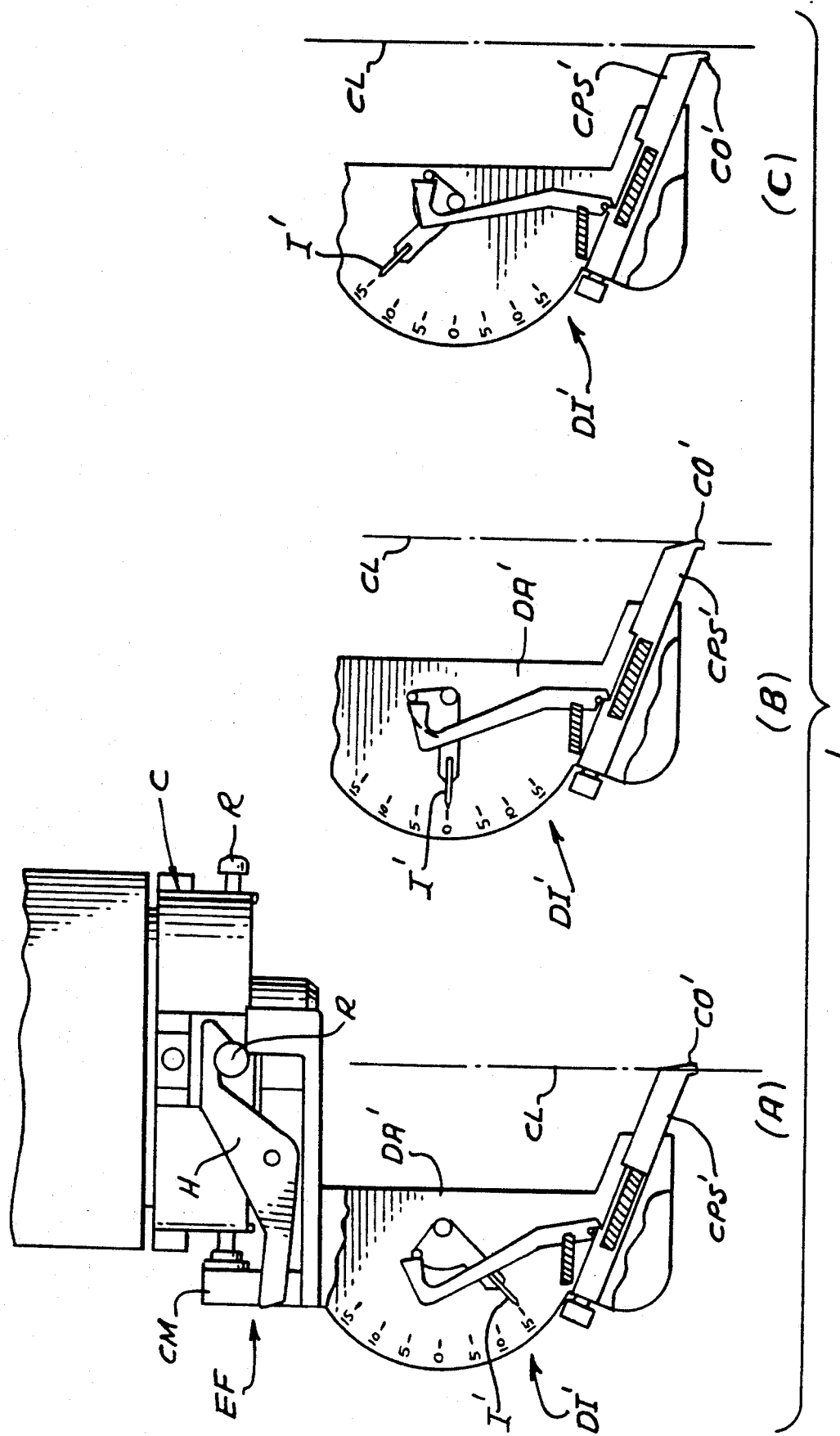
FIG. 14A, B & C is a diagrammatic representation of a dial indicator assembly constructed integrally with the edge finder assembly and illustrating the dial indication before reaching the zero point in FIG. 14A, on the zero point in FIG. 14B and beyond the zero point in FIG. 14C.

An alternate construction of the dial indicator DI' is illustrated in FIGS. 14A, B, C that is constructed integrally with the edge finder assembly EF. As illustrated, the dial indicating assembly DI' is constructed integrally with the dependent arm DA' for the edge finder assembly EF. The contact probe shaft CPS' has one end, the right hand end as illustrated, with the contact edge point CO' and is spring mounted as in the previous embodiment. In this embodiment the linear movements of the shaft CPS' are coupled to control the rotary movements of the needle indicator I' over the incremented dial face by means of linkages as illustrated. The "0" indicated position is illustrated in FIG. 14B wherein the contact probe CO' is in vertical alignment with the spindle/tool axis CL. FIG. 14A illustrates the position of the linked elements of the dial indicator I' when the contact surface CO' is beyond the center line CL in the positive direction, to the right of the line CL and the needle indicator I' indicates the minus 15 (−15) position on the dial face. This means the calibration of the edge finder EF must cause the needle I' to rotate clockwise 15 increments to achieve the zero point of FIG. 14B. Similarly, in FIG. 14C the contact point CO' is illustrated to the left side of the center line CL and thereby the needle indicator I' registers a plus 15 (+15) from the zero position. To achieve the zero position, the calibration of the assembly EF must cause the needle indicator I' to rotate counter-clockwise 15 increments to achieve the zero position.

From the above description, those skilled in the edge finding art can appreciate that the present disclosure has advanced the state of the art through the provision of two elements for achieving the true zero locations of the "X" & "Y" edges of a workpiece. One piece is a collar, to be secured to the nose cone for the machine tool and is constructed and defined with four flat surfaces on the outside thereof in quadrature with one another. Four adjustable reference members are placed on the flat surfaces of the collar and are adapted to readily and quickly mount an edge finder indicator assembly thereon. The adjustable reference members are utilized to calibrate the edge finding apparatus so that the edge finder assembly can be consistently relocated on the collar in the correct position. The edge finder assembly eliminates operator errors through the spring biasing of the holding arms for clamping the assembly on the mounted collar. The invention also eliminates the need for removal of the cutting tool during the edge locating procedures.

Although the invention has been described in conjunction with locating the edges of a rectangular workpiece, it maybe also be advantageously used to locate the center point of holes in a workpiece or the center point of a round workpiece. In addition, the apparatus may be utilized to determine that the vise is in perpendicular alignment with the surface of the mill table.

I claim:

1. A collar for mounting on a head of a machine tool carrying a cutting tool for use with an edge finder to locate the "zero" position of the "X" and "Y" axis of a workpiece mounted on the machine tool relative to the cutting tool, the collar having a configuration to fully seat to the preselected portion of the machine tool head and a preselected depth, the collar including means for securing the collar to the preselected portion of a machine tool head, the collar further including a plurality of flat surfaces of a preselected area and constructed and defined on the outside surface of the collar and arranged in quadrature on the surface so as to be alignable with the "X" and "Y" axis of a workpiece mounted on the machine tool, each flat surface having an adjustable reference member for use to calibrate the edge finder, the reference members each extending a preselected distance outwardly of the individual flat surfaces.

2. A collar for mounting on a head of a machine tool carrying a cutting tool for use with an edge finder to locate the "zero" position of the "X" &"Y" axis of a workpiece mounted on a machine tool, relative to the cutting tool as defined in claim 1 wherein said means for securing the collar to said machine tool head comprise a plurality of fastening means rotatably secured to the collar at a plurality of locations adjacent each of said flat surfaces.

3. A collar for mounting on a head of a machine tool as defined in claim 1 wherein each of said reference members are constructed and defined with four of said flat surfaces arranged in quadrature around the outside surface of said collar with each surface having an individual reference member adjustably secured thereto.

4. A collar for mounting on a head of a machine tool as defined in claim 1 or 3 wherein each of said reference members are constructed in the form of a fastener with an enlarged, arcuate head with an adjusting portion defined in the head for receiving an adjusting tool to calibrate the position of the reference member.

5. A collar for mounting on a head of a machine tool as defined in claim 4 wherein each of said reference members are constructed and defined of stainless steel to be rotatably adjustable and the head having a flat surface with arcuate ends of a preselected radius and said adjusting portion being an aperture arranged in said flat surface.

6. A collar for mounting on a head of a machine tool as defined in claim 1 wherein the machine tool head includes a quill body with a nose cone of a larger diameter, said preselected portion of the machine tool is the quill of the head whereby the collar is fully seated to the nose cone.

7. A collar for mounting on a head of a machine tool as defined in claim 1 or 6 wherein the collar has a circular configuration with a stepped bore.

8. A collar for mounting on a head of a machine tool as defined in claim 1 wherein each of the flat surfaces extend a preselected distance beyond one end of the collar and on the bottom surface thereof.

9. A collar for mounting on a head of a machine tool as defined in claim 6 wherein the collar has a stepped bore constructed and defined relative to said quill to permit the collar to be fully seated on the nose cone for the quill.

10. An edge finder indicator assembly to be clamped to a preselected portion of the head for a machine tool, said preselected portion being provided with a plurality of diametrically spaced adjustable securing elements for holding the assembly on the head, said assembly comprising:
- a U-like clamping means adapted to be clamped to said preselected portion of the head for the machine tool from one side of the head,
- a pair of holding members pivotally secured to opposite sides of the clamping structure with the outer end of each holding member being adapted to be releasably snapped onto an individual securing member on the head,
- yieldable means secured between an individual holding member and the clamping structure to continuously bias the holding member to a securing element when positioned thereon, said yieldable means being pivotable away from the securing member upon the application of a pivoting force being applied to the opposite end of the members from the secured ends thereof,
- extension means mounted substantially centrally of the U-like clamping structure and extending downwardly and slidably mounting a contact probe and carrying a dial indicator coupled to be responsive to the sliding movements of the contact probe and indicating preselected increments of movement, and
- a seating member mounted substantially centrally of the holding members on said clamping means and extending upwardly therefrom for seating with a reference member on the head when the clamping means are secured on the head.

11. An edge finder indicator assembly as defined in claim 10 wherein the contact probe is constructed and defined as a point contact.

12. An edge finder indicator assembly for a machine tool having a head to be clamped to a preselected portion of the head, said preselected portion being provided with a plurality diametrically spaced securing elements for holding the assembly on the head, said assembly comprising:
- a U-like clamping structure adapted to be clamped to said preselected portion of the head for the machine tool from one side of the head,
- a pair of holding members pivotally secured to said clamping structure on opposite sides thereof with the free ends of each of said members being adapted to be releasably snapped to an individual securing element on the head to thereby clamp the clamping structure to the head,
- spring means for each holding member secured between an individual holding member and the clamping structure to continuously maintain the holding member secured at the individual holding member once snapped thereto and to be released from the securing member upon a force being applied to the holding members adjacent the opposite ends of the holding members from the secured ends to cause the holding member to pivot away from the head's securing members to thereby permit the clamping structure to be removed from the head,
- a dependent arm mounted substantially centrally of the U-like clamping structure having a dependent arm extending a preselected distance downwardly therefrom and slidably carrying a contact arm adjacent the free end thereof, the contact arm being longitudinally slidable in a plane substantially perpendicular to said dependent arm, the contact arm mounting a point contact element for touching engagement with a surface and thereby cause the contact arm to be slidably responsive and in unison with the direction of movement of the point contact,
- and indicating means being coupled to be movable in response to the movements of the contact arm and indicating preselected increments of movement about a reference point, and
- a seating member mounted substantially centrally of the arms of the U-like clamping structure and extending a preselected distance upward of the clamping structure, the seating member having a hollow bore, said seating member functioning to seat a securing element for said machine tool head.

13. An edge finder indicator assembly adapted to be clamped to a head for a machine tool having a pair of spaced securing members comprising a U-like clamping structure to be clamped to said head, from one end thereof, said clamping structure including a pair of holding arms, pivotally secured to the clamping structure on opposite sides of the structure, one end of each holding arm being constructed and defined with an open ended securing aperture to be movably mounted to a securing member for the machine tool to thereby hold the arms and thereby said clamping structure consistently in place on the head of a machine tool, individual yieldable means for the holding arms extending between an individual holding arm and the clamping structure to continuously keep the holding arms in a secured position with said securing member and being responsive to a pivoting force applied to the opposite ends of the holding arms from said securing apertures to cause the holding arms to pivot away from the securing members to thereby release said clamping assembly from the machine tool head, the opposite ends of the holding arms being defined with a generally L-shaped hook end spaced from the clamping structure to permit lateral movement of the holding arms a preselected distance when the holding arms are mounted to said securing member and are arrested by engagement with the clamping structure,
- the clamping structure including an upstanding seating member mounted substantially centrally of the holding arms and extending a preselected distance upwardly of the holding structure, said seating member having a central bore with the inner end being defined with an enlarged, tapered end for seating a securing member of the machine tool head,
- the clamping structure includes a dependent arm mounted substantially centrally of said structure and extending a preselected distance downwardly therefrom and slidably mounting at the free end thereof a contact probe extending therefrom to permit the contact probe to be slidably moved longitudinally with respect to the dependent arm, and
- dial indicating means coupled to the contact probe to be movable in unison with the longitudinal movements of the contact probe and indicating the increments of movement at the dial therefore.

14. An improved edge finding apparatus for a machine tool carrying a cutting tool to locate the "zero" position of the "X" & "Y" axis of a workpiece mounted on the machine tool relative to the cutting tool, said machine tool having a head, said apparatus comprising:

a collar having a circular configuration with an inside diameter to permit the collar to be fully seated on the machine tool head and a preselected depth, means for securing the collar to the machine tool head, the collar includes a plurality of flat surfaces having a preselected area constructed and defined on the outside surface of the collar and arranged in quadrature with one another so as to be alignable with the "X" & "Y" axis of a workpiece mounted on the machine tool, each flat surface having an adjustable reference member extending a preselected distance outwardly from an individual flat surface and being longitudinally adjustable for adjusting said preselected distance, each flat surface extending below the depth of the collar for defining flat surfaces extending beyond the depth of the collar and in quadrature with the body of the collar along the bottom of the collar body a preselected distance, a U-like clamping structure adapted to be mounted to said collar when secured to the machine tool head, said clamping structure including a pair of holding arms that are each pivotally secured to the clamping structure and arranged on opposite sides of the clamping structure to thereby mount on opposite sides of the machine tool head, the holding arms being constructed and defined at their free ends for complimentary engagement with an adjustable reference member for said collar to permit the holding arms to be releasably secured to the reference members when mounted thereto, the holding arms being pivotable relative to the structure to permit the holding arms to be disengaged clamping from the reference members when a pivoting force is applied to the arms at a point adjacent the ends, opposite to the free ends thereof, the engagement of the holding arms and the reference members being effective to hold the clamping structure in a clamped relationship with the machine tool head and the collar mounted thereon, individual yieldable means for each holding arm secured between an individual holding arm and the clamping structure to continuously keep the holding arms in engagement with the reference members when engaged therewith and against the bottom flat surfaces of the collar, the clamping structure including an upstanding seating member mounted substantially centrally of the holding arms and extending a preselected distance upwardly of the holding structure to permit a reference member to engage the seating member when the clamping structure is mounted to the machine tool head to thereby seat the clamping structure in a horizontal plane, the seating member and the reference members being complimentarily constructed and defined for permitting the longitudinal extension of the reference members from their individual flat surfaces to be individually adjusted, the clamping structure including a dependent arm mounted substantially centrally of said structure and extending a preselected distance below the clamping structure, the dependent arm carrying a slidable contact probe at the free end thereof adapted to extend in quadrature from the dependent arm so as to be longitudinally slidable upon engagement with a surface of a workpiece mounted on the machine tool, and indicating means coupled to be responsive to the longitudinal movements of the contact probe for indicating the zero position of the probe or the distance on opposite sides of the zero position, the adjustment of the reference member permits the position of the member to be changed to achieve the zero position.

15. An improved edge finding apparatus as defined in claim 14 wherein said upstanding seating member is constructed with a substantially central bore with the end of the bore seating a reference member being constructed and defined with an enlarged end portion tapering inwardly a preselected distance, and the reference member having a head with arcuate ends for engaging the end of the bore seating the reference member at the tapering portion of said end at essentially a point contact, the reference member head being further constructed and defined in a complimentary relationship with the end of an adjusting tool inserted through the central bore of the seating member to operate on the reference member.

16. An improved edge finding apparatus as defined in claim 14 or 15 wherein each arm of the U-like clamping structure is constructed and defined with flat surfaces on the top sides of the arms of the clamping structure adjacent the ends thereof for mating engagement with said flat surfaces extending under the collar body when said clamping structure is mounted on the collar to thereby define the vertical location of the clamping structure on the head of the machine tool.

17. An improved edge finding apparatus as defined in claim 14 wherein the head of the machine tool includes a quill having a nose cone secured to the head of the machine tool with the quill extending downwardly therefrom and a drill chuck for mounting a cutting tool dependent from the quill, said collar being adapted to be seated at the nose cone for the quill.

18. An improved edge finding apparatus as defined in claim 14 wherein said contact probe is constructed and defined to provide a point contact for engagement with a workpiece.

19. A method of locating the true zero position of the X & Y axis of a workpiece relative to the centerline of a tool mounted in a machine tool for cutting a workpiece in accordance with a working drawing, said method comprising:

mounting and securing a collar on a preselected portion of the head of said machine tool, the collar having a plurality of flat surfaces of a preselected area defined on the outside surface of the collar and arranged in quadrature spaced relationship with one another so as to lie parallel to the X & Y axis of a workpiece mounted on the machine tool when the workpiece is moved in alignment with one of said flat surfaces, each flat surface having an adjustable reference member extending a preselected distance outwardly of the flat surfaces and also functioning as securing elements, mounting an edge finder indicator assembly by releasably securing said assembly on a pair of diametrically spaced reference members on the collar to thereby clamp said assembly on the machine tool head in a fixed vertical position, said assembly being constructed and defined to carry a slidable contact probe and a dial indicator coupled to be responsive to the longitudinal sliding movements of the contact probe and indicating the increments of movement about a reference point, locating the center of the machine tool spindle and a tool carried thereby in relationship to an edge of a workpiece mounted on the machine tool and then moving the workpiece into edge contact with said contact probe, observing the position indicated by the dial indicator as to the reference point, if the dial indicator is not at the reference point, adjust the position of the reference member intermediate the pair of diametrically spaced reference members securing said edge finder in a direction to cause the dial indicator to move to the reference point, removing the edge finder assembly from the head of the machine tool and mounting said assembly on another pair of diametrically spaced reference members on the collar, repeating the steps of locating the center line of the machine tool spindle and tool relative to the edge of the workpiece lying parallel to the reference members carrying said assembly, and repeating the aforementioned steps for each remaining edge surfaces of the workpiece whereby the X & Y distances can be measured from each X & Y edge for machining purposes, after each edge surface is operated on, remove the edge finder assembly for preparation for machining the workpiece whereby the measurements for machining may be measured from any X or Y edge.

20. A method of locating the true zero position of the X & Y axis of a workpiece relative to the centerline of a tool mounted in a machine tool for cutting a workpiece in accordance with a working drawing, said method comprising:

mounting and securing a collar on a preselected portion of the head of a machine tool, the collar having a plurality of flat surfaces of a preselected area defined on the outside surface of the collar and arranged in quadrature spaced relationship with one another, so as to lie parallel to the X & Y axis of a workpiece mounted on the machine tool when the workpiece is moved in alignment with one of said flat surfaces, each flat surface having an adjustable reference member extending a preselected distance outwardly of the flat surfaces and also functioning as securing elements, mounting an edge finder indicator assembly by releasably securing said assembly on a pair of diametrically spaced reference members on the collar to thereby clamp said assembly on the machine tool head in a fixed vertical position, said assembly being constructed and defined to carry a slidable contact probe and a dial indicator coupled to be responsive to the longitudinal sliding movements of the contact probe and indicating the increments of movement about a reference point, locating the center of the machine tool spindle and a tool carried thereby in relationship to an edge of a workpiece mounted on the machine tool and then moving the workpiece into edge contact with said contact probe, observing the position indicated by the dial indicator as to the reference point, if the dial indicator is not at the reference point, adjust the position of the reference member intermediate the pair of diametrically spaced reference members securing said edge finder in a direction to cause the dial indicator to move to the reference point, repeating the steps for locating the center of machine tool spindle and tool relative the remaining surfaces of the workpiece by mounting the edge finder assembly parallel to the workpiece to be aligned with the spindle.

21. A method of locating the true zero position of the X & Y axis of a workpiece as defined in claim 19 or 20 wherein the machine tool head includes a nose cone having a dependent quill and the step of mounting said collar is further characterized as mounting the collar on said nose cone.

22. An improved edge finding apparatus for a machine tool having a cutting to locate the true positions of the X & Y axis of a workpiece mounted on the machine tool relative to the cutting tool, said machine tool characterized as having a head provided with four flat surfaces spaced in quadrature around the head and spaced outwardly of the head proper to provide a flat surface at the bottom of each flat surface, each flat surface mounting a reference member extending outwardly therefrom and adjustable as to the extension from the flat surfaces, U-shaped clamping means adapted to be releasably snapped into secure relationship with a pair of diametrically spaced reference members, said clamping means being constructed and defined with a flat surface for mating with the bottom flat surfaces individual to the reference members functioning to secure the clamping means and an upstanding seating member arranged to extend upwardly of the clamping means for seating a reference member spaced between said reference means functioning to secure the clamping means, said seating member permitting adjustment of the seated reference member to horizontally align the collar and the clamping means, the clamping means including a dependent contact probe means mounted substantially centrally of and in parallel alignment with the arm of the U-shaped clamping means, the contact probe means being adapted to be longitudinally movable and coupled to an indicating means for indicating preselected increments of movement of the probe.

* * * * *